Feb. 28, 1933.  E. MEYER  1,899,393
APPARATUS FOR MOLDING BELTS
Filed March 22, 1929
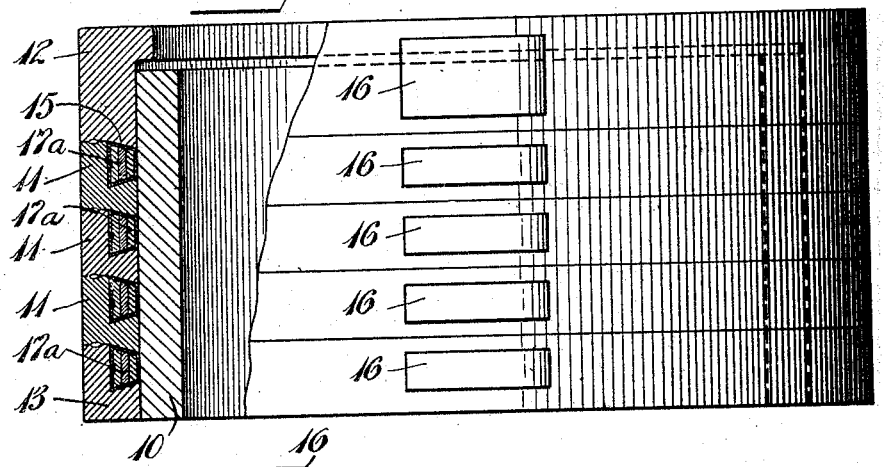
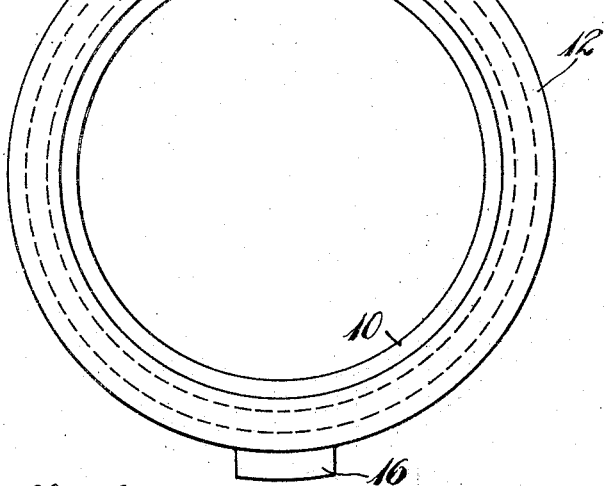
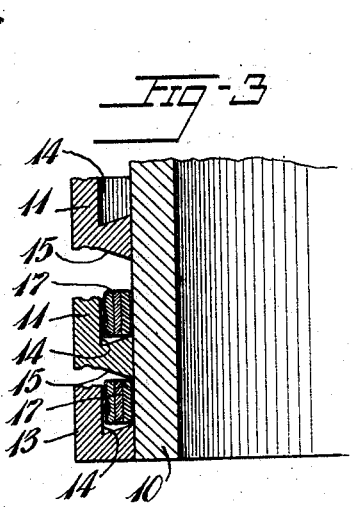
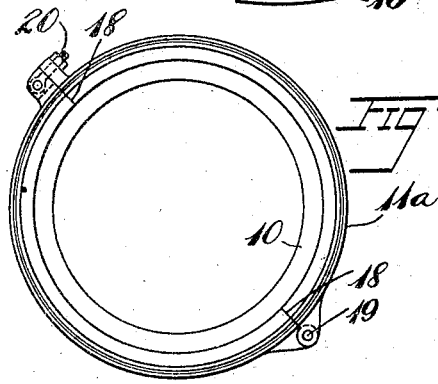
Inventor
Ernest Meyer
By Eakin & Avery
Attys Patented Feb. 28, 1933

1,899,393

UNITED STATES PATENT OFFICE

ERNEST MEYER, OF AKRON, OHIO, ASSIGNOR TO THE B. F. GOODRICH COMPANY, OF NEW YORK, N. Y., A CORPORATION OF NEW YORK

APPARATUS FOR MOLDING BELTS

Application filed March 22, 1929. Serial No. 349,212.

This invention relates to apparatus for molding belts, and more especially to multiple sectional molds for concurrently shaping and vulcanizing a plurality of endless belts or rings of rubberized fibrous material while the rings are under tension.

The chief object of the invention is to provide an improved mold for the purpose mentioned which will shape all faces of the belt. A more specific object is to avoid the use of fabric wrappers with molds for endless belts.

Of the accompanying drawing:

Fig. 1 is a side elevation of a mold structure embodying my invention in its preferred form, and the work therein, a part being broken away and a part being in section.

Fig. 2 is a plan view of the mold.

Fig. 3 is a fragmentary sectional view of the mold, and the work therein, during the operation of assembling the work and the mold sections.

Fig. 4 is a modification of my improved mold structure.

Referring to the drawing, the mold comprises a tubular axial member or mandrel 10 upon the outer periphery of which is mounted a series of annular mold sections 11, 11 of identical construction, and top and bottom mold sections 12, 13 respectively, all of said mold sections engaging the mandrel 10 with a sliding fit. Each of the mold sections 11 and section 13 has a circumferential cavity or recess 14 formed at the juncture of its inner peripheral face and one of its adjoining lateral faces, and the opposite lateral faces of the sections 11 and the adjacent face of the section 12 are formed respectively with molding faces 15. The arrangement is such that when the mold sections 11, 12, 13 are mounted in laterally abutting relation upon the axial mandrel 10 they define a plurality of closed, annular, four sided molding cavities. Each of the mold sections 10, 11, 12 is formed externally at opposite sides with radial lugs 16, 16 which permit the application of a suitable tool for separating the respective sections to remove vulcanized articles therefrom.

As shown in Fig. 3 of the drawing, the work comprises rings 17, 17 of fabric and unvulcanized rubber which may be formed in any suitable manner, but each of which preferably comprises, as here shown, a body structure of plies of flexible material having substantial tensile strength and a wrapper or cover ply of rubberized fabric thereon. The rings 17 may be rectangular in cross-section as shown. The finished belts or rings formed by the molding and vulcanizing of the rings 17 are shown at 17a, 17a, Fig. 1.

In the operation of my improved mold, the bottom mold section 13 is mounted upon the mandrel 10 at one end thereof. Unvulcanized rings 17 under longitudinal tension and mold sections 11 are mounted thereon in alternation, as shown in Fig. 3, and lastly the top mold section 12 is mounted upon the mandrel. The assembled structure is then mounted in a vulcanizing press (not shown), pressure applied to the top mold section to forcibly close the mold, as illustrated in Fig. 1, and the rings are thus molded and vulcanized to the desired cross-sectional form while they are held under circumferential tension in the mold cavities.

The invention provides simple apparatus for full-molding a plurality of rings under tension in a single mold structure. By obviating the use of fabric wrappers with molds of this character, I provide for uniformity of pressure upon the rings during vulcanization and uniformity of contour in the finished rings. All the molding fins or rands are disposed longitudinally of the rings so that they readily may be trimmed therefrom.

The modified structure shown in Fig. 4 comprises a tubular mandrel 10 and a plurality of circumscribing mold sections, such as the section 11a, which are similar in contour to the sections 11 of the preferred structure. Each mold section 11a is transversely split at 18, 18 at diametrically opposite points, and the respective parts of the section are hinged together at 19, and provided with a latching device 20 by which said parts may be secured together to form an annular structure. The arrangement facilitates the removal of the mold sections from the mandrel since they do not require to be forced axially of the latter.

My invention may be otherwise modified within the scope of the appended claim.

I claim:

Apparatus for molding V-type belts, said apparatus comprising a cylindrical mold member adapted to have a plurality of belts mounted thereon and a plurality of annular mold members adapted to be assembled on said cylindrical mold member in contact therewith and by movement axially of the latter to apply molding pressure to the belts, said annular members being so shaped that in conjunction with the cylindrical member they define a plurality of annular trapezoidal molding cavities.

In witness whereof I have hereunto set my hand this 20th day of March, 1929.

ERNEST MEYER.